US009883406B2

(12) United States Patent
Hassan et al.

(10) Patent No.: US 9,883,406 B2
(45) Date of Patent: Jan. 30, 2018

(54) GUARD BAND USAGE FOR WIRELESS DATA TRANSMISSION

(71) Applicant: Microsoft Technology Licensing, LLC, Redmond, WA (US)

(72) Inventors: Amer A. Hassan, Kirkland, WA (US); Todd Haugen, Bellevue, WA (US); Paul W. Garnett, Albany, NY (US); Paul William Alexander Mitchell, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/139,998

(22) Filed: Apr. 27, 2016

(65) Prior Publication Data
US 2016/0242041 A1    Aug. 18, 2016

Related U.S. Application Data

(62) Division of application No. 14/252,507, filed on Apr. 14, 2014, now Pat. No. 9,357,402.

(60) Provisional application No. 61/944,453, filed on Feb. 25, 2014.

(51) Int. Cl.
| H04W 40/00 | (2009.01) |
| H04W 16/14 | (2009.01) |
| H04W 24/00 | (2009.01) |
| H04W 24/02 | (2009.01) |
| H04W 72/04 | (2009.01) |

(52) U.S. Cl.
CPC ........... *H04W 16/14* (2013.01); *H04W 24/00* (2013.01); *H04W 24/02* (2013.01); *H04W 72/0453* (2013.01)

(58) Field of Classification Search
CPC ..... H04W 16/14; H04W 24/00; H04W 24/02; H04W 72/0453
USPC ......... 455/447, 454, 500; 370/227, 228, 252
See application file for complete search history.

(56) References Cited

U.S. PATENT DOCUMENTS

| 8,175,539 | B2 | 5/2012 | Diener et al. |
| 8,274,885 | B2 | 9/2012 | Wu et al. |
| 8,315,663 | B2 | 11/2012 | Hamdi et al. |
| 8,599,773 | B2 | 12/2013 | Hsu et al. |

(Continued)

FOREIGN PATENT DOCUMENTS

| WO | WO-2012171729 | 12/2012 |
| WO | WO-2012173434 | 12/2012 |

OTHER PUBLICATIONS

"A Handoff Using Guard Channels Scheme (HGCS) for Cognitive Radio Networks", Global Journal of Computer Science and Technology, vol. 11 Issue 20 Version 1.0, Dec. 2011, 9 Pages.

(Continued)

*Primary Examiner* — Wayne Cai

(57) ABSTRACT

Techniques for guard band usage for wireless data transmission are described. In at least some embodiments, white spaces in the radio spectrum (e.g., television (TV) white spaces) and guard bands between licensed bands of the radio spectrum are leveraged for data transmission. Based on available white spaces and service deployment in the licensed bands, various decisions can be made regarding how to leverage white spaces and guard bands for wireless data transmission.

20 Claims, 11 Drawing Sheets

(56) References Cited

U.S. PATENT DOCUMENTS

| | | | |
|---|---|---|---|
| 8,643,789 B2* | 2/2014 | Williams | H04H 60/43 348/21 |
| 9,357,402 B2 | 5/2016 | Hassan et al. | |
| 2011/0194468 A1 | 8/2011 | Mehrotra | |
| 2011/0211489 A1 | 9/2011 | Chung et al. | |
| 2011/0287802 A1 | 11/2011 | Ma et al. | |
| 2013/0059614 A1 | 3/2013 | Kannan et al. | |
| 2013/0235810 A1 | 9/2013 | Kasslin et al. | |
| 2013/0242762 A1 | 9/2013 | Bennett et al. | |
| 2014/0038655 A1 | 2/2014 | Garnett et al. | |
| 2014/0080501 A1 | 3/2014 | Lee et al. | |
| 2014/0085544 A1 | 3/2014 | Williams et al. | |
| 2014/0135048 A1 | 5/2014 | Kasslin et al. | |
| 2015/0245218 A1 | 8/2015 | Hassan et al. | |

OTHER PUBLICATIONS

"Dynamic Spectrum Management", Whitepaper of Inter Digital Inc. Available at <http://www.interdigital.com/wp-content/uploads/2012/10/InterDigital-DSM-White-Paper_Oct2012.pdf>, Oct. 2012, 14 pages.

"Final Office Action", U.S. Appl. No. 14/252,507, dated Oct. 9, 2015, 7 pages.

"International Search Report and Written Opinion", Application No. PCT/US2015/016731, dated Jun. 23, 2015, 15 Pages.

"Non-Final Office Action", U.S. Appl. No. 14/252,507, dated May 8, 2015, 14 pages.

"Notice of Allowance", U.S. Appl. No. 14/252,507, dated Jan. 25, 2016, 7 pages.

"Second Written Opinion", Application No. PCT/US2015/016731, dated Jan. 26, 2016, 10 pages.

"International Preliminary Report on Patentability", Application No. PCT/US2015/016731, dated May 10, 2016, 10 pages.

"Supplemental Notice of Allowance", U.S. Appl. No. 14/252,507, dated May 6, 2016, 2 pages.

"Foreign Office Action", RU Application No. 2016134456, dated Oct. 6, 2016, 3 pages.

"Office Action Issued in European Patent Application No. 15709790.8", Dated: Sep. 6, 2017, 5 pages.

* cited by examiner

GUARD BAND USAGE FOR WIRELESS DATA TRANSMISSION

RELATED APPLICATIONS

This application is a divisional of and claims priority to U.S. patent application Ser. No. 14/252,507 entitled "Guard Band Usage for Wireless Data Transmission" and filed Apr. 14, 2014 which in turn claims priority under 35 U.S.C. §119(e) to U.S. Provisional Patent Application No. 61/944,453, filed on Feb. 25, 2014 and titled "Guard Band Usage for Wireless Data Transmission," the entire disclosures of which are incorporated in their entirety by reference herein.

BACKGROUND

Many devices today utilize some form of wireless radio frequency (RF) data communication. Examples of RF communication include cellular networks (e.g., for cell phones), data broadband (e.g., Wi-Fi®), broadcast television, global positioning system (GPS) navigation, and so forth. Typically, different forms of RF communication use different portions of the radio spectrum. While many portions of the radio spectrum are allocated and/or licensed for particular uses, there remain portions that are underutilized. Underutilized portions of the radio spectrum may be leveraged for various purposes, such as for unlicensed forms of RF communication. Any use of such underutilized portions, however, must avoid interference with existing licensed RF communications and must comply with regulatory requirements for RF communication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for guard band usage for wireless data transmission are described. In at least some embodiments, white spaces in the radio spectrum (e.g., television (TV) white spaces) and guard bands between licensed portions of the radio spectrum are leveraged for data transmission.

For instance, embodiments employ a channel database that tracks available white spaces and notifies various wireless base stations and/or client devices of the available white spaces. The channel database may also notify wireless base stations and/or client devices regarding whether there is service deployment in licensed bands that occur adjacent to guard bands in the radio spectrum. Based on available white spaces and service deployment in the licensed bands, various decisions can be made regarding how to leverage white spaces and guard bands for wireless data transmission.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for guard band usage for wireless data transmission are described. In at least some embodiments, white spaces in the radio spectrum (e.g., television (TV) white spaces) and guard bands between licensed portions of the radio spectrum are leveraged for data transmission.

For instance, embodiments employ a channel database that tracks available white spaces and notifies various wireless base stations and/or client devices of the available white spaces. The channel database may also notify wireless base stations and/or client devices regarding whether there is service deployment in licensed bands that occur adjacent to guard bands in the radio spectrum. Based on available white spaces and service deployment in the licensed bands, various decisions can be made regarding how to leverage white spaces and guard bands for wireless data transmission.

In at least some embodiments, white spaces and/or guard bands can be leveraged to transmit wireless broadband data, such as for data transmission as part of a wireless local area network (WLAN). The data transmission, for example, can be performed according to the 802.11 Standards for wireless data communication managed by the Institute of Electrical and Electronics Engineers (IEEE). The 802.11 Standards are often referred to as "Wi-Fi®", but are referenced to herein in various ways.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example procedures for guard band usage for wireless data transmission in accordance with one or more embodiments. Finally, a section entitled "Example System and Device" describes an example system and device that are operable to employ techniques discussed herein in accordance with one or more embodiments.

Example Environment

Figure 1:
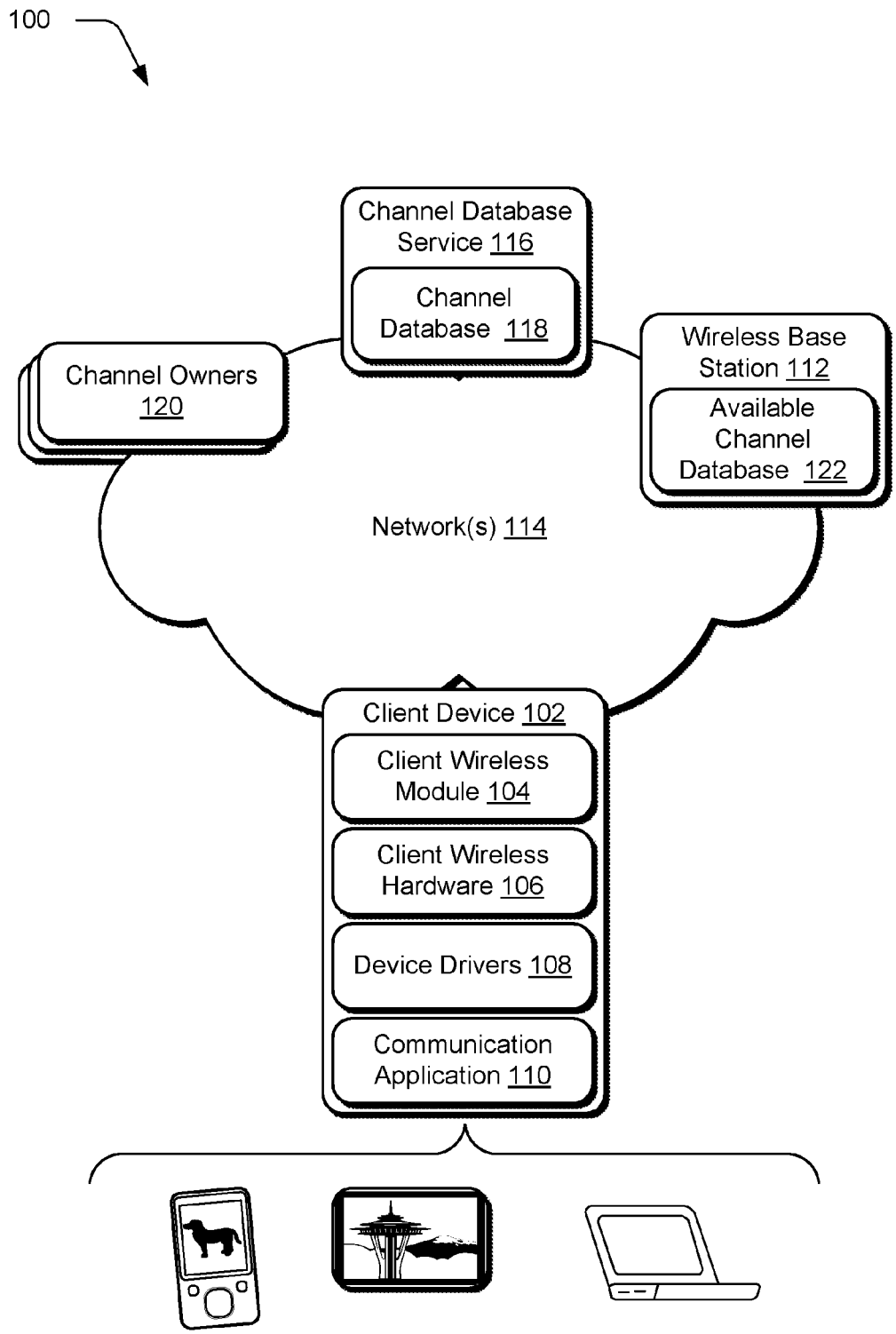
FIG. 1 is an illustration of an environment in an example implementation that is operable to employ techniques discussed herein in accordance with one or more embodiments.

FIG. 1 is an illustration of an environment 100 in an example implementation that is operable to employ techniques for guard band usage for wireless data transmission. Environment 100 includes a client device 102 which can be embodied as any suitable device such as, by way of example and not limitation, a smartphone, a tablet computer, a portable computer (e.g., a laptop), a desktop computer, and so forth. One of a variety of different examples of a client device 102 is shown and described below in FIG. 12.

The client device 102 of FIG. 1 is illustrated as including a client wireless module 104, which is representative of functionality to enable the client device 102 to communicate wirelessly with other devices and/or entities. The client wireless module 104 can be configured to enable data communication via a variety of different wireless techniques and protocols. Examples of such techniques and/or protocols include cellular communications (e.g. 3G, 4G, Long Term Evolution (LTE), and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16 or 802.22), wireless telephone networks, and so on. For instance, the client wireless module 104 is configured to perform various aspects of techniques for guard band usage for wireless data transmission discussed herein.

The client device 102 further includes client wireless hardware 106, which is representative of various hardware components that can be employed to enable the client device 102 to communicate wirelessly. Examples of the client wireless hardware 106 include radio transmitters, radio receivers, various types and/or combinations of antennas, impedance matching functionality, and so on. In at least some embodiments, the client device 102 is a multi-radio device that can communicate via different wireless technologies and/or protocols.

Further included as part of the client device 102 are one or more device drivers 108, which are representative of functionality to enable the client device 102 to interact with various devices, and vice-versa. For instance, the device drivers 108 can enable interaction between various functionalities of the client device 102 (e.g., an operating system, applications, services, and so on) and different devices of the client device 102, such as input/output (I/O) devices. The device drivers 108, for instance, can enable interaction between the client wireless module 104 and the client wireless hardware 106 to enable the client device 102 to transmit and receive wireless signals.

In at least some embodiments, the client device 102 is configured to communicate with other devices and/or entities via a communication application 110. Generally, the communication application 110 is representative of functionality to enable different forms of communication via the client device 102. Examples of the communication application 110 include a voice communication application (e.g., a Voice over Internet Protocol (VoIP) client), a video communication application, a messaging application, a content sharing application, and combinations thereof. The communication application 110, for instance, enables different communication modalities to be combined to provide diverse communication scenarios.

The environment 100 further includes a wireless base station 112, which is representative of a radio receiver and transmitter that serves as a hub for at least some wireless portions of network(s) 114. In at least some embodiments, the wireless base station 112 may serve as a gateway between wired and wireless portions of the network(s) 114. The wireless base station 112 also includes functionality for performing various aspects of the techniques for guard band usage for wireless data transmission discussed herein, which are discussed in detail below. According to one or more embodiments, the wireless base station 112 includes functionality for wireless communication via a variety of different wireless technologies and protocols, examples of which are discussed elsewhere herein.

Generally, the network 114 is representative of a single network or a combination of different interconnected networks. In at least some embodiments, the network 114 represents different portions of the radio spectrum that may be leveraged for wireless communication. The network 114, for instance, represents radio spectrum in different frequency bands, such as ultra-high frequency (UHF), super-high frequency (SHF), and so forth. The network 114 may also represent a combination of wireless and wired networks and may be configured in a variety of ways, such as a wide area network (WAN), a local area network (LAN), the Internet, and so forth.

The environment 100 further includes a channel database service 116, which is representative of functionality to track and/or manage various attributes of wireless channels. The channel database service 116, for instance, can track channel utilization for different wireless channels, e.g., whether a particular wireless channel is in use and/or is available to be used for wireless communication, level of channel usage for different channels, and so forth. The channel database service 116 may track and monitor various other attributes of wireless channel, such as channel quality, signal-to-noise ratios for different channels, noise floor in particular channels, and so forth. For example, the channel database service 116 maintains a channel database 118 that stores status information for different wireless channels. As further detailed below, the channel database service 116 may provide channel information from the channel database 118 to different entities (e.g., the wireless base station 112 and/or the client device 102) to enable wireless channels to be selected for wireless communication.

In at least some embodiments, the channel database service 116 receives information regarding wireless channels from channel owners 120. Generally, the channel owners 120 are representative of different entities that have certain rights and/or privileges to different portions of the radio spectrum. For instance, the channel owners 120 may represent licensees of certain portions of the radio spectrum in a particular market and/or markets, such as television networks, cellular carriers, radio stations, and so forth. The channel owners 120 may also represent entities that are granted exclusive or shared access to particular frequency bands, such as government organizations, emergency services, academic and/or research entities, and so forth. Generally, licenses and privileges for access to different portions of the radio spectrum are regulated by government organizations, such as the Federal Communications Commission (FCC) in the United States, the Office of Communications (OFCOM) in the United Kingdom, and so forth.

As further illustrated in the environment 100, the wireless base station 112 includes an available channel database 122, which is representative of a database of wireless channels that are available for wireless communication in the network 114. The available channel database 122, for instance, can be populated with channel information received from the channel database service 116. In at least some embodiments, available channel information from the available channel database 122 can be propagated to the client device 102 to enable a channel and/or channels to be selected for wireless communication. Further details concerning identification and selection of wireless channels are presented below.

According to implementations discussed herein, techniques can be employed to establish wireless data communication between the client device 102 and other devices utilizing a variety of different wireless data communication techniques and/or protocols. For instance, channels that are identified in the available channel database 122 may be leveraged for wireless communication via various of the 802.11 standards. This is not intended to be limiting, however, and a wide variety of different wireless techniques and protocols may be utilized in accordance with the disclosed embodiments. Further, while certain aspects of established wireless protocols (e.g., 802.11, Wi-Fi Direct™, and so on) may be utilized in tandem with techniques discussed herein to enable wireless data communication between devices, techniques discussed herein are inventive and are not to be considered part of these protocols as they currently exist.

Having described an example environment in which the techniques described herein may operate, consider now a discussion of some example implementation scenarios in accordance with one or more embodiments.

Example Implementation Scenarios

The following discussion describes example implementation scenarios for guard band usage for wireless data transmission in accordance with one or more embodiments. In portions of the following discussion, reference will be made to the environment 100 of FIG. 1.

Figure 2:
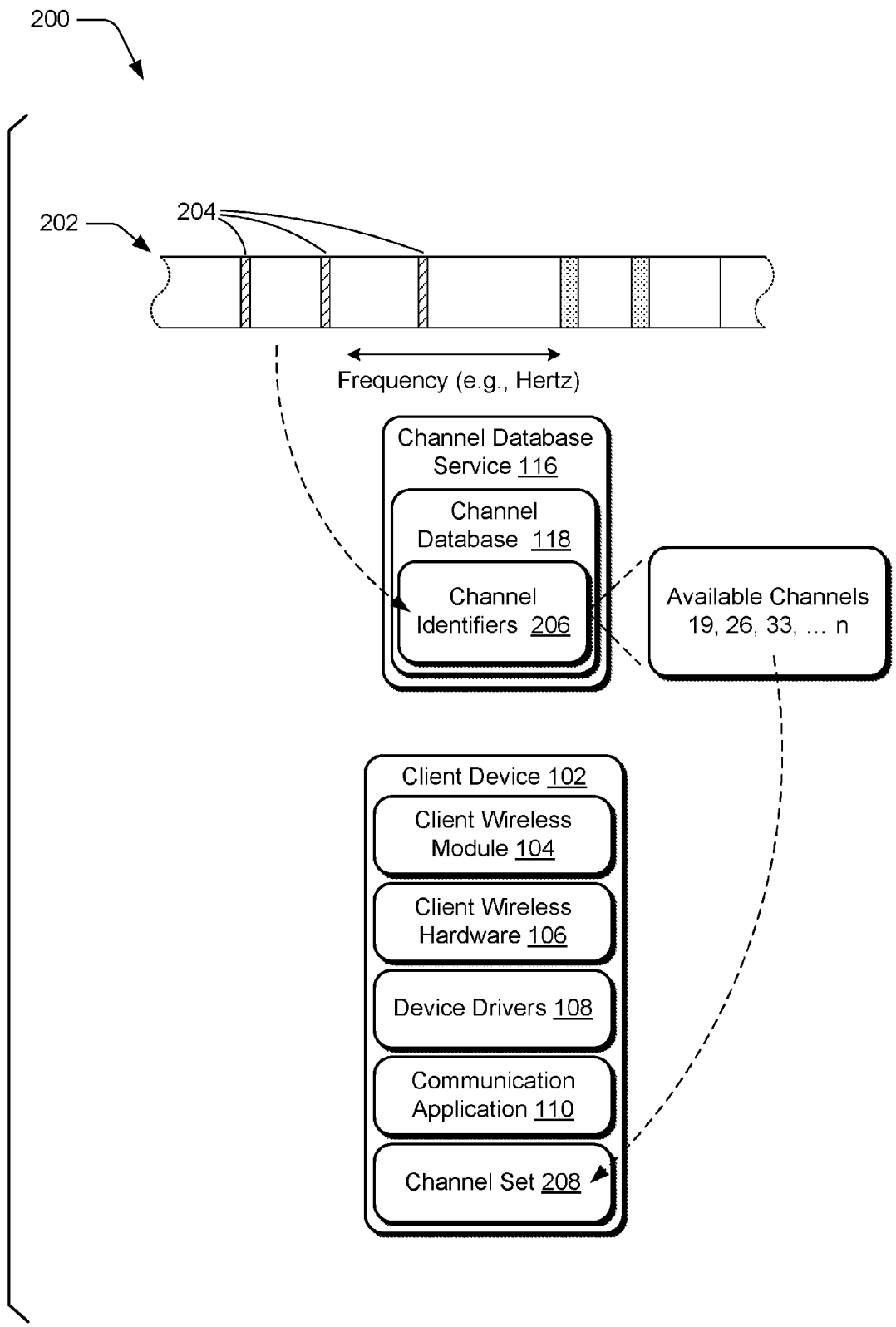
FIG. 2 illustrates an example implementation scenario for determining available wireless channels in accordance with one or more embodiments.

FIG. 2 illustrates an example implementation scenario 200 for determining available wireless channels in accordance with one or more embodiments.

In the scenario 200, the channel database service 116 determines that a spectrum portion 202 of the radio spectrum includes a set of available channels 204. In this particular example, the spectrum portion 202 corresponds to a portion of the UHF region of the radio spectrum. This is not to be construed as limiting, however, and a variety of different regions of the radio spectrum may be employed in accordance with the claimed embodiments.

The channel database service 116 may determine the available channels 204 in a variety of different ways. For instance, channel owners 120 for individual of the respective available channels 204 may notify the channel database service 116 of the available channels 204. Alternatively or additionally, the channel database service 116 may query the channel owners 120 as to whether their respective channels are being utilized. As yet another example, the channel database service 116 may detect that the available channels are not being leveraged for signal broadcasting.

As an example implementation, consider that the available channels 204 corresponds to "white spaces" in the spectrum portion 202 of the radio spectrum. The available channels 204, for instance, may be licensed to particular channel owners 120 and/or allocated for particular uses. The available channels 204, however, are not currently in use.

For example, the available channels 204 may occur in the 700-megahertz band that includes broadcast television channels. Thus, the available channels 204 may correspond to discrete television channels that are licensed to particular channel owners 120 but are not being utilized to broadcast television content. In at least some embodiments, the channel owners 120 for the respective available channels 204 may notify the channel database service 116 as such. Channels between and/or adjacent to the available channels 204 may correspond to television channels that are in use for broadcasting television content and/or other types of information.

Further to the scenario 200, the channel database service 116 stores channel identifiers 206 for the available channels 204 as part of the channel database 118. The channel database service 116 then provides the channel identifiers 206 to the client device 102, such as in response to a query from the client device 102 for available channels. The channel identifiers 206 may identify the available channels 204 in various ways, such as with reference to frequency ranges for the individual available channels 204, channel numbers for the channels (e.g., assigned based on a regional band plan), and so forth.

In at least some embodiments, for instance, the client device 102 (e.g., via the client wireless module 104) can query the channel database service 116 for available channels on a periodic basis (e.g., every 24 hours) and/or in response to various events, such as an initiation of a communication session via the communication application 110. The client device 102 stores the channel identifiers 206 as part of a channel set 208 that generally corresponds to channels that are available to the client device 102 for wireless communication. The client device 102 may utilize one or more channels identified in the channel set 208 to initiate and/or participate in wireless data communication.

Figure 3:
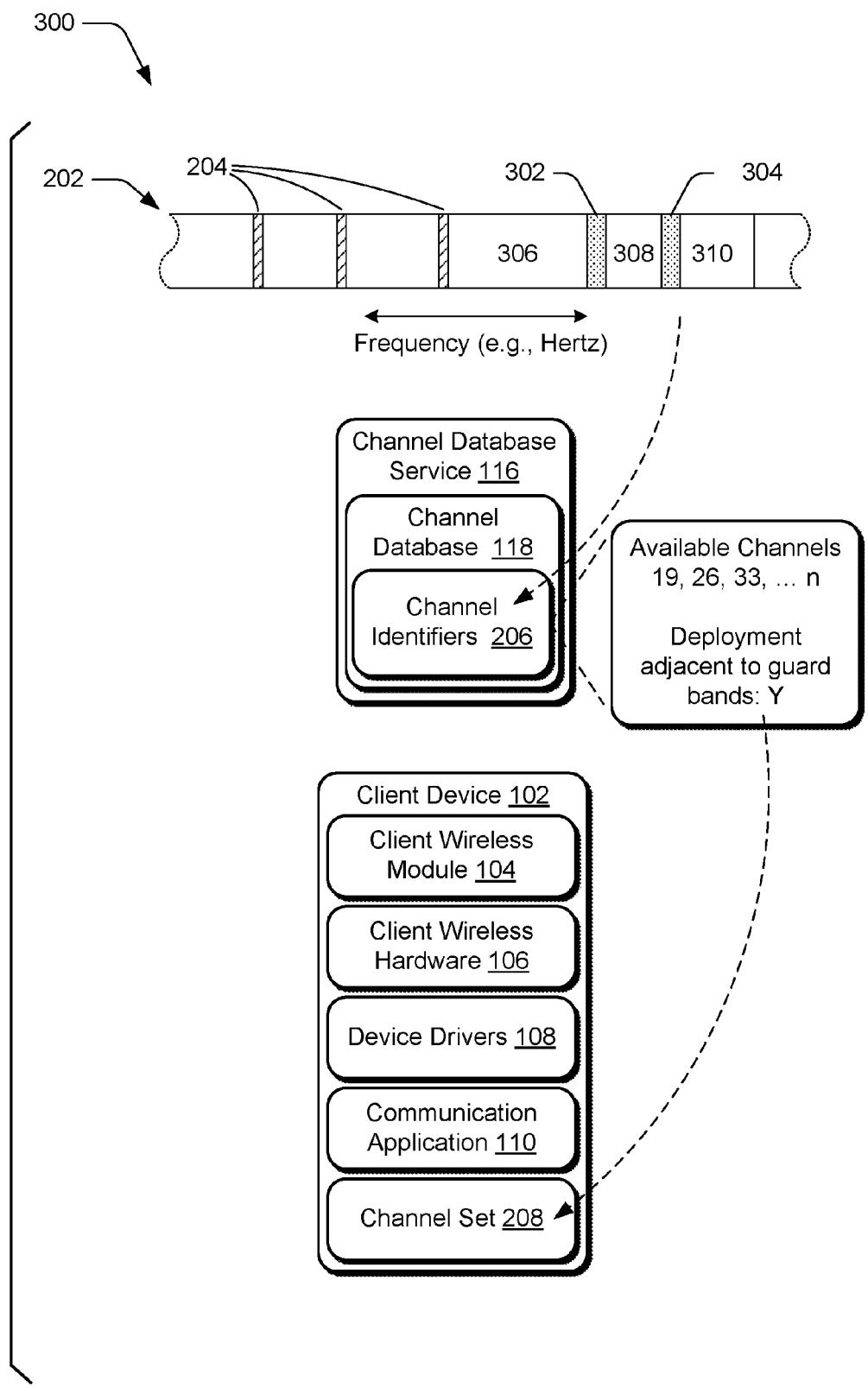
FIG. 3 illustrates an example implementation scenario for determining guard band usage for data transmission in accordance with one or more embodiments.

FIG. 3 illustrates an example implementation scenario 300 for determining guard band usage for data transmission in accordance with one or more embodiments.

The scenario 300 includes the spectrum portion 202 of the radio spectrum introduced above with reference to FIG. 2. In addition to the available channels 204, the spectrum portion 202 includes a first guard band 302 and a second guard band 304. Generally, the guard bands 302, 304 represent unused regions of the radio spectrum that separate different active regions of the radio spectrum. The guard bands 302, 304, for example, serve as buffers to minimize and/or prevent interference between adjacent active portions of the radio spectrum.

In the scenario 300, the guard band 302 separates a television region 306 of the spectrum portion 202 (e.g., where the available channels 204 occur) from a downlink portion 308. The guard band 304 separates the downlink portion 308 from an uplink portion 310. In at least some embodiments, the guard band 304 represents a duplex gap between the downlink portion 308 and the uplink portion 310.

Generally, the downlink portion 308 is utilized for downlink communication, such as from a cellular base station to the client device 102. The uplink portion 310 is utilized for uplink communication, such as from the client device 102 to a base station and/or other entity. In at least some embodiments, the downlink portion 308 and the uplink portion 310 correspond to LTE downlink and uplink portions, respectively. These examples are not to be construed as limiting, however, and the guard bands 302, 304 may occur in other portions of the radio spectrum not specifically discussed herein.

Also illustrated is that in at least some embodiments, the channel database service 116 may track whether there is service deployment in the regions adjacent to the guard bands 302, 304, e.g., in the downlink portion 308 and the uplink portion 310. For instance, in at least some geographical regions and/or markets, the infrastructure for deployment of service in the downlink portion 308 and the uplink portion 310 may not be in place or may not be active. Thus, in such regions, the downlink portion 308 and the uplink portion 310 may not be in use.

In this particular example, the channel database 118 indicates that there is deployment in the downlink portion 308 and the uplink portion 310. Thus, when the client device 102 utilizes one or more of the guard bands 302, 304 for data transmission, the client device 102 will monitor for activity in the downlink portion 308 and the uplink portion 310.

In other example scenarios, however, there may not be deployment in the downlink portion 308 and the uplink portion 310. In these scenarios, the client device may not monitor for activity in the downlink portion 308 and the uplink portion 310, and thus may make full use of the guard bands 302, 304 for transmitting signals.

Further to the scenario 300, the client device 102 determines various attributes of the downlink portion 308 and the uplink portion 310 and, based on these attributes, decides whether and/or how the guard bands 302, 304 may be utilized for wireless communication. For instance, the client device 102 can detect whether there is downlink traffic in the downlink portion 308 and/or uplink traffic in the uplink portion 310 and, based on whether there is traffic in the respective portions, decide how the guard bands 302, 304 may be leveraged as channels for wireless data communication. Example ways of optimizing usage of the guard bands 302, 304 for wireless communication are discussed below.

Based on its analysis of the downlink portion 308 and/or the uplink portion 310, the client device 102 updates the channel set 208 to specify whether and/or how the downlink portion 308 and/or the uplink portion 310 may be utilized for wireless communication. Thus, the channel set 208 can identify various portions of the radio spectrum that are available for wireless communication, such as the available channels 204, the guard bands 302, 304, and/or other channels. The client device 102 (e.g., the client wireless module 104) can consider various criteria in determining which of the channels to select when engaging in wireless data communication. Examples of such criteria include channel quality (e.g., signal-to-noise (S/N) ratio), channel congestion, and so forth.

Figure 4:
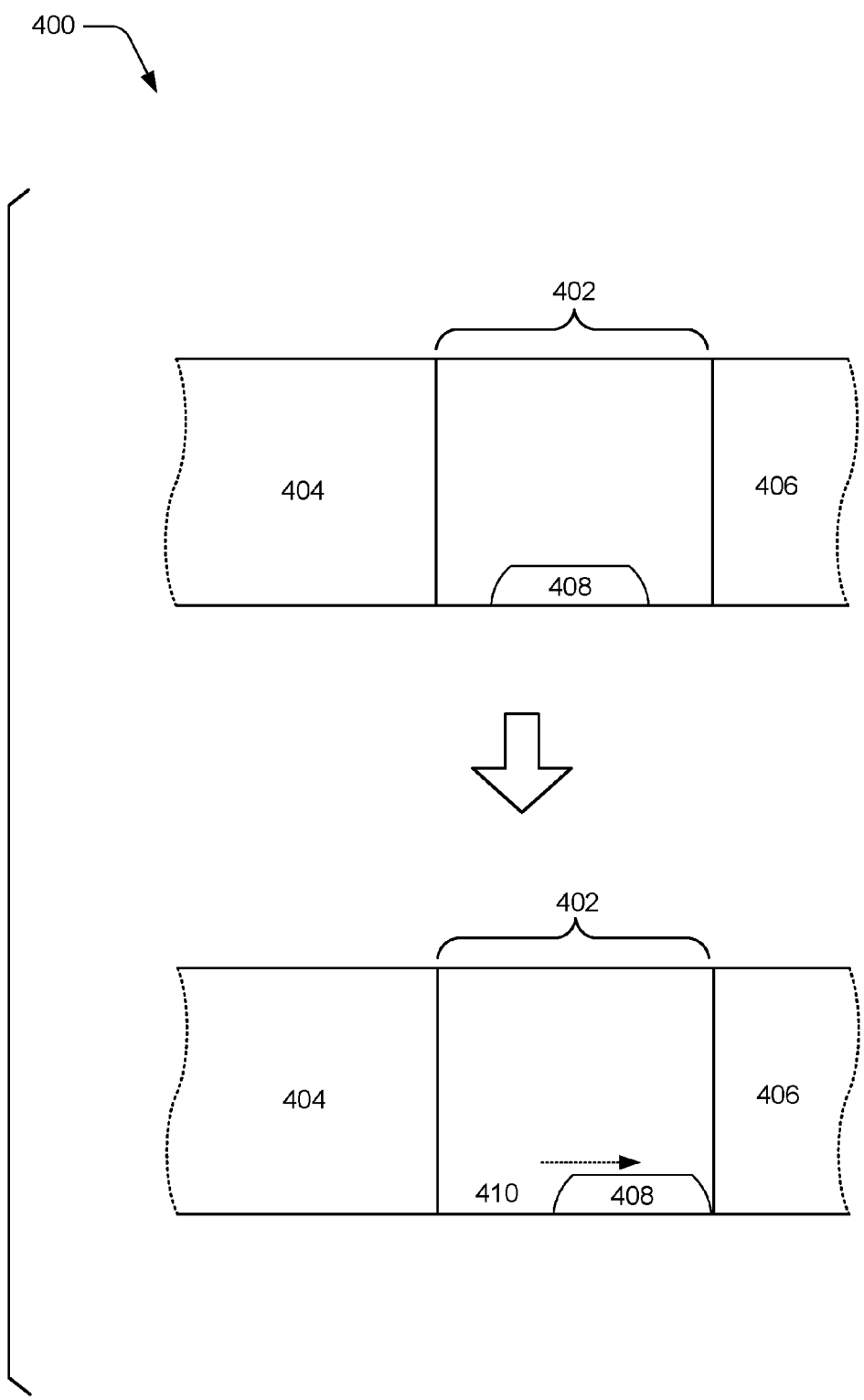
FIG. 4 illustrates an example implementation scenario for determining guard band usage for data transmission in accordance with one or more embodiments.

FIG. 4 illustrates an example implementation scenario 400 for determining guard band usage for data transmission in accordance with one or more embodiments.

The upper portion of the scenario 400 illustrates a guard band 402 which, in at least some embodiments, represents an implementation of one or more of the guard bands 302, 304 introduced above. Adjacent to the guard band 402 is a licensed region 404 and a licensed region 406, which represent regions of the radio spectrum that are licensed and/or allocated for particular purposes. In at least some embodiments, the licensed regions 404, 406 represent implementations of the downlink portion 308 and the uplink portion 310, respectively, which were introduced above.

A prerequisite on usage of the guard band 402 is that the usage avoids interference with radio traffic in the licensed regions 404, 406. Thus, embodiments employ various techniques to ascertain whether there is activity in one or more of the licensed regions 404, 406. Based on whether traffic is detected in one or more of the licensed regions 404, 406 (e.g., uplink and/or downlink traffic), usage of the guard band 402 can be modified.

In the upper portion of the scenario 400, little or no traffic is detected in the licensed regions 404, 406. Thus, the guard band 402 may be leveraged in various ways, such as for a communication channel 408. Generally, the communication channel 408 represents a discrete frequency band that can be utilized to transmit and/or receive data, such as for wireless broadband. In this particular example, the communication channel 408 is centered in the guard band 402. Although a single communication channel 408 is illustrated, embodiments may employ multiple communication channels within a guard band and/or a white space.

Continuing to the lower portion of the scenario 400, consider that traffic is detected in the licensed region 404 but little or no traffic is detected in the licensed region 406. Traffic in the licensed region 404, for instance, corresponds to downlink traffic, such as from a cellular base station to a cellular device, e.g., the client device 102. The presence and/or level of traffic in a particular region can be detected in various ways. For instance, the client device 102 itself can detect the traffic. Alternatively or additionally, a remote service can detect the traffic, such as the wireless base station 112 and/or the channel database service 116. In embodiments where a remote service detects the presence and/or level of traffic, the remote service can notify a client device (e.g., the client device 102) of the presence and/or level of traffic.

Further to the scenario 400, in response detecting traffic in the licensed region 404 but little or no traffic in the licensed region 406, usage of the guard band 402 for a communication channel 408 is adjusted accordingly. As illustrated, for instance, the center frequency of the communication channel 408 is increased such that the communication channel 408 is moved away from the licensed region 404 and towards the licensed region 406. According to various embodiments, this provides a buffer region 410 that minimizes or prevents interference between the communication channel 408 and the signal activity in the licensed region 404.

Figure 5:
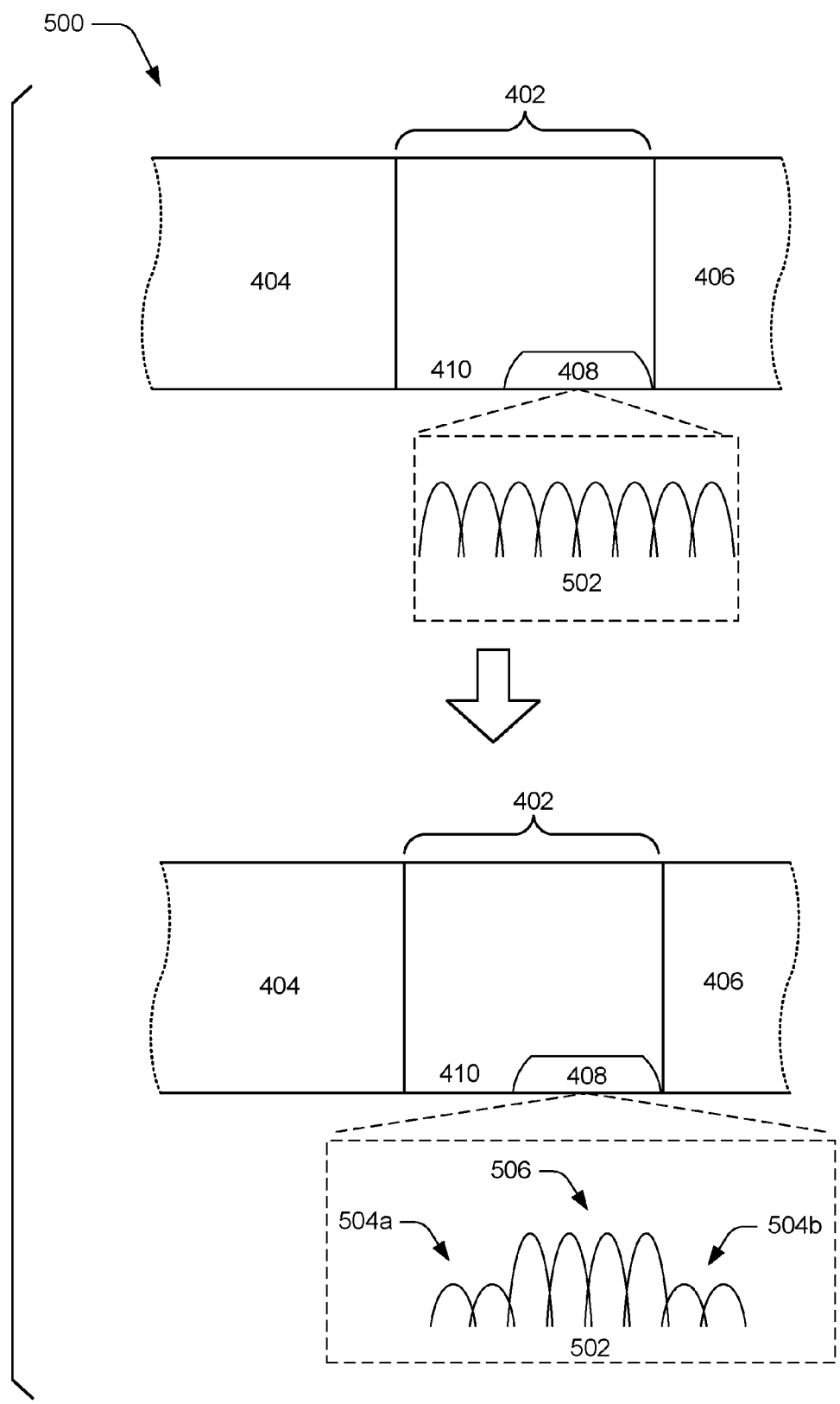
FIG. 5 illustrates an example implementation scenario for determining guard band usage for data transmission in accordance with one or more embodiments.

FIG. 5 illustrates another example implementation scenario 500 for determining guard band usage for data transmission in accordance with one or more embodiments. In at least some embodiments, the scenario 500 represents an extension of the scenario 400 discussed above.

In the upper portion of the scenario 500, consider that the communication channel 408 is being used to transmit a signal 502. In at least some embodiments, the signal 502 is an orthogonal frequency-division multiplexing (OFDM) signal that utilizes subcarrier signals. The signal 502, for instance, can be implemented as a WiFi™ OFDM signal that is divided into 52 subcarriers signals. The number of subcarriers illustrated as part of the signal 502 is presented for purpose of example only, and it is to be appreciated that any suitable number of subcarriers may be employed.

Consider now that traffic is then detected in the licensed region 406 as well as the licensed region 404. In response to detecting the traffic in the licensed region 406, at least some subcarriers of the signal 502 are modified.

For example, proceeding to the lower portion of the scenario 500, the outer subcarriers 504a, 504b of the signal 502 are attenuated. Transmission power for the outer subcarriers 504a, 504b, for instance, is reduced, such as by a pre-specified amount. Further, transmission power of the inner subcarriers 506 is increased, such as by a pre-specified amount. In at least some embodiments, increasing the transmission power of the inner subcarriers 506 is optional.

According to one or more embodiments, the outer subcarriers 504a, 504b may be attenuated and/or the inner subcarriers 506 amplified without altering the bandwidth of the communication channel 408 or the signal 502. For instance, attenuation of the outer subcarriers 504a, 504b may be proportion to amplification of the inner subcarriers 506, and vice-versa.

Attenuation of the outer portions of the signal 502 (e.g., the outer subcarriers 504a, 504b) decreases the amount of interference that may occur between the signal 502 and signals in the licensed band 406. By so modifying the signal 502, the communication channel 408 may continue to be used for transmitting communication data while reducing interference with signals in adjacent bands.

Having discussed some example implementation scenarios, consider now some example procedures in accordance with one or more embodiments.

Example Procedures

Figure 6:
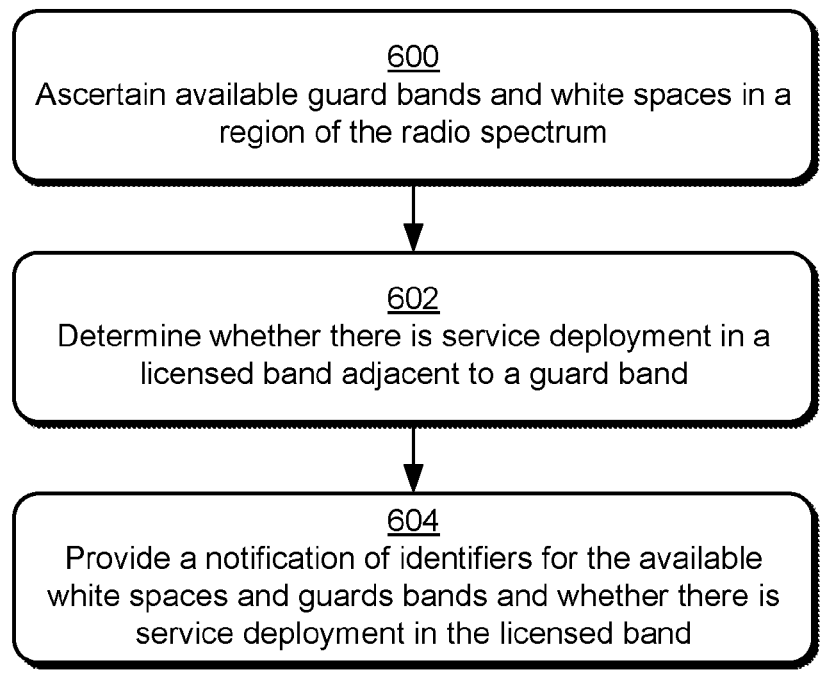
FIG. 6 is a flow diagram that describes steps in a method for maintaining a channel database in accordance with one or more embodiments.

FIG. 6 is a flow diagram that describes steps in a method for maintaining a channel database in accordance with one or more embodiments.

Step 600 ascertains available white spaces and guard bands in a region of the radio spectrum. The channel database service 116, for instance, identifies guard bands and white space channels in a particular geographical region. The channel database service 116 can identify guard bands and white spaces in a variety of ways. For instance, channel owners 120 for the white spaces can notify the channel database service 116 that their respective channels are not being utilized. Alternatively or additionally, the channel database service 116 can query channel owners 120 as to whether there is deployment in their respective channels. The channel database service 116 may also scan a region of the radio spectrum to identify available guard bands and/or white spaces. Other ways of identifying white spaces not expressly discussed herein may be employed.

Step 602 determines whether there is service deployment in a licensed band adjacent to a guard band. With reference to the implementation scenarios discussed above, the channel database service 116 can determine whether there is service deployment that utilizes the downlink portion 308 and the uplink portion 310. For instance, in an example implementation where the downlink portion 308 and the uplink portion 310 are in a region of the spectrum allocated for LTE deployment, the channel database service 116 can ascertain whether there is actual LTE service deployment in that region.

Step 604 provides a notification of identifiers for the available white spaces and guard bands and whether there is service deployment in the licensed band. For instance, the channel database service 116 notifies the wireless base station 112 and/or the client device 102 of available channels, e.g., the available channels 204 introduced above. The channel database service 116 may further provide a notification as to whether there is service deployment in the downlink portion 308 and the uplink portion 310.

In at least some embodiments, white space availability may be dynamically updated in various ways. For instance, consider the following example procedure.

Figure 7:
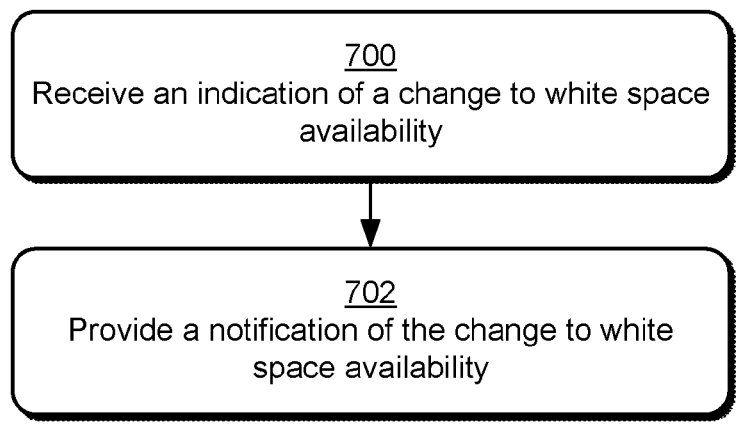
FIG. 7 is a flow diagram that describes steps in a method for dynamically updating a channel database in accordance with one or more embodiments.

FIG. 7 is a flow diagram that describes steps in a method for dynamically updating a channel database in accordance with one or more embodiments.

Step 700 receives an indication of a change to white space availability. For instance, the channel database service 116 may periodically query the channel owners 120 regarding availability of their respective channels. Thus, additional white spaces may become available if a channel that was previously being used ceases being used, e.g., goes "off the air." Further, a channel that was previously identified as being a white space may go into use (e.g., for broadcast television), and thus its identification as a white space may be withdrawn.

Step 702 provides a notification of the change to white space availability. For instance, the channel database service 116 notifies the wireless base station 112 and/or the client device 102 of the change, e.g., that an additional white space is available and/or that a previously-available white space is no longer available.

Figure 8:
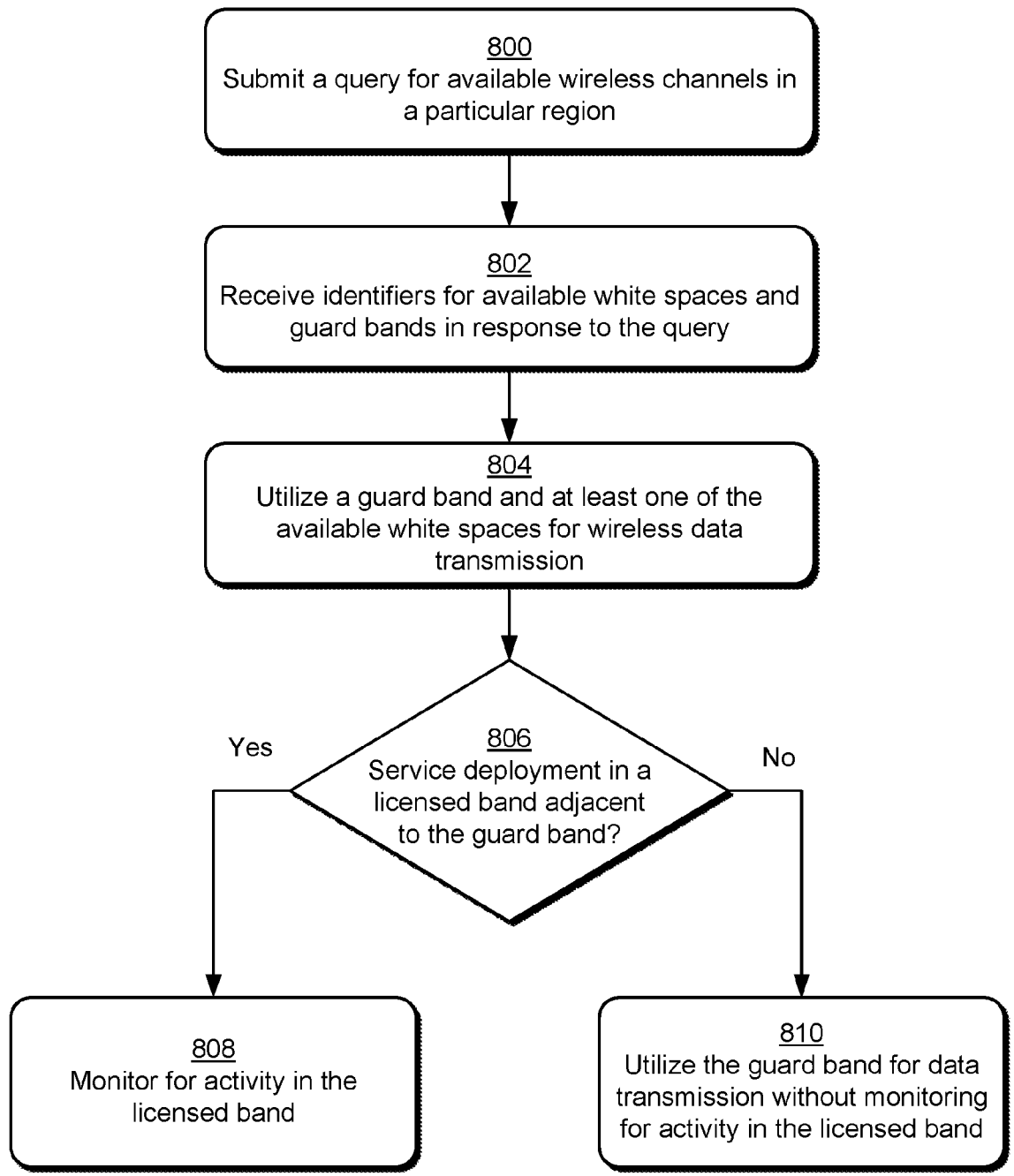
FIG. 8 is a flow diagram that describes steps in a method for determining available regions for data transmission in accordance with one or more embodiments.

FIG. 8 is a flow diagram that describes steps in a method for determining available regions for data transmission in accordance with one or more embodiments.

Step 800 submits a query for available wireless channels in a particular region. For instance, the client device 102 queries the wireless base station 112 for available channels.

Step 802 receives identifiers for available white spaces and guard bands in response to the query. The client device 102, for example, receives identifiers for white space channels and/or guard bands that are available in the region.

Step 804 utilizes a guard band and at least one of the available white spaces for wireless data transmission. The client device 102, for example, can transmit data in one or more white spaces as well as one or more guard bands. In at least some embodiments, the data can be transmitted as part of a communication session, such as managed by the communication application 110.

According to one or more embodiments, which white space(s) to select for data transmission can depend on attributes of the individual white spaces. For instance, white spaces with a lower noise floor can be preferred over those with a higher noise floor. Further, white spaces with less traffic (e.g., from other devices) can be preferred over those with more traffic. As another example, white spaces that are adjacent other white spaces can be preferred over those that are adjacent active channels, e.g., channels that are being used for television broadcasting and so forth.

Step 806 determines whether there is service deployment in a licensed band adjacent to the guard band. For instance, the client device 102 may receive information from the client database service 116 indicating whether there is service deployment in the licensed band.

Alternatively or additionally, the client device 102 may monitor for activity (e.g., downlink and/or uplink activity) in the licensed band. If activity is detected, the client device 102 may determine that there is service deployment in the licensed band. Otherwise, if no activity is detected (e.g., over a specified time period), the client device 102 may determine that there is no service deployment in the licensed band.

If there is service deployment in the licensed band adjacent to the guard band ("Yes"), step 808 monitors for activity in the licensed band. The client device 102, for example, monitors for uplink and/or downlink activity in the licensed band while transmitting data in the guard band. As detailed herein, if activity in the licensed band is detected, usage of the guard band for data transmission can be modified in various ways.

If there is no service deployment in the licensed band adjacent to the guard band ("No"), step 810 utilizes the guard band for data transmission without monitoring for activity in the licensed band. By not having to monitor for activity in the licensed band, power consumption can be reduced and various computing resources can be conserved. Further, knowing that there is no service deployment in the licensed band enables the guard band to be more fully utilized for data transmission.

Figure 9:
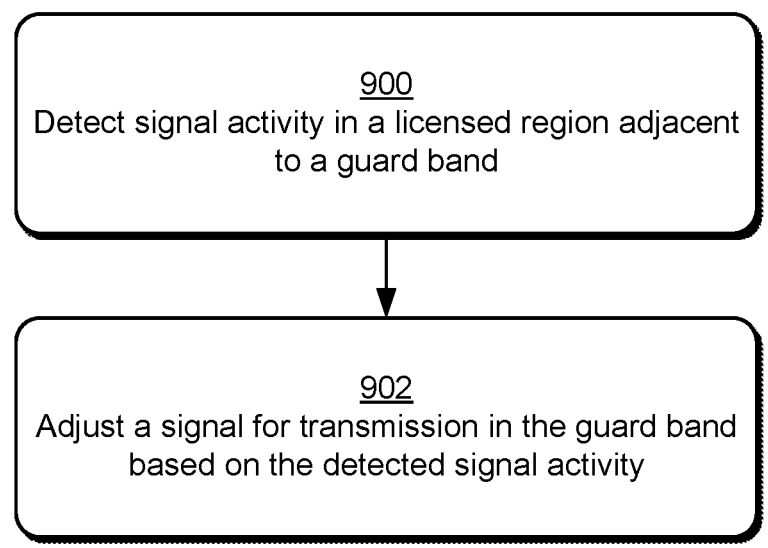
FIG. 9 is a flow diagram that describes steps in a method for adjusting guard band usage in accordance with one or more embodiments.

FIG. 9 is a flow diagram that describes steps in a method for adjusting guard band usage in accordance with one or more embodiments. The method, for instance, is an extension of the method described above with reference to FIG. 8.

Step 900 detects signal activity in a licensed region adjacent to a guard band. The client device 102, for example, detects the signal activity, such as uplink and/or downlink activity. In at least some embodiments, the signal activity may be detected prior to initiating use of the guard band for data transmission, and/or while the guard band is being used for data transmission. The signal activity, for example, may be detected while a communication session is in progress that is utilizing the guard band for data transmission.

Step 902 adjusts a signal for transmission in the guard band based on the detected signal activity. The frequency range used to transmit the signal, for instance, can be increased or decreased away from the licensed region, such as discussed above with reference to FIG. 4. Alternatively or additionally, some subcarrier channels of the signal can be attenuated to avoid interference with the detected signal activity, such as discussed above with reference to FIG. 5.

In at least some embodiments, center frequency adjustment and subcarrier attenuation may be used in combination to modify a signal for transmission in a guard band. For instance, when signal activity is detected in a first region adjacent to a guard band, the center of frequency of a signal being transmitted in the guard band can be moved away from the first region. Then, when signal activity is detected at a second region adjacent the guard band, exterior subcarriers of the signal being transmitted in the guard band can be attenuated to reduce interference with the signal activity in the second region. Thus, the combination of center frequency adjusting and subcarrier attenuation provides a flexible way of responding the changing conditions when utilizing a guard band for data transmission.

Figure 10:
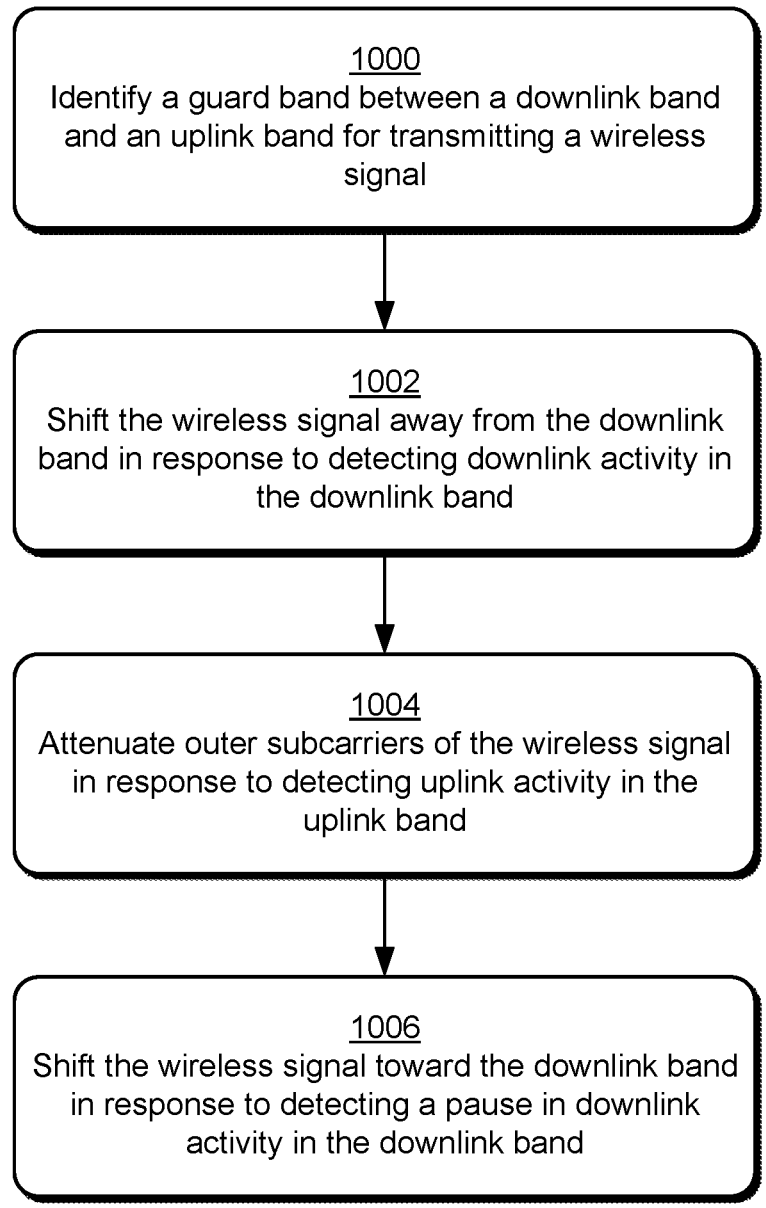
FIG. 10 is a flow diagram that describes steps in a method for adjusting guard band usage based on downlink and uplink activity in accordance with one or more embodiments.

FIG. 10 is a flow diagram that describes steps in a method for adjusting guard band usage based on downlink and uplink activity in accordance with one or more embodiments. The method, for instance, describes a detailed implementation of the method described above with reference to FIG. 9.

Step 1000 identifies a guard band between a downlink band and an uplink band for transmitting a wireless signal. The guard band, for instance, can be identified by the client device 102 and/or the channel database service 116. In at least some embodiments, the guard band may be a duplex gap between the downlink band and the uplink band, such as between an LTE downlink band and an LTE uplink band.

Step 1002 shifts the wireless signal away from the downlink band in response to detecting downlink activity in the downlink band. The client device 102, for instance, can shift the center frequency of the wireless signal away from the downlink band and towards the uplink band in response to detecting the downlink activity. See, for example, the implementation scenario 400 discussed above.

Step 1004 attenuates outer subcarriers of the wireless signal in response to detecting uplink activity in the uplink band. For instance, the client device 102 can reduce transmission power of outer subcarriers of the wireless signal, such as illustrated above in the implementation scenario 500. In at least some embodiments, attenuating the outer subcarriers reduces interference between the wireless signal and the uplink activity.

Step 1006 shifts the wireless signal toward the downlink band in response to detecting a pause in downlink activity in the downlink band. For instance, while monitoring activity in the downlink band, the client device 102 can detect that downlink activity has stopped for a specified period of time. In response, the client device 102 shifts the center frequency of the wireless signal toward the downlink band, e.g., away from the uplink band. Optionally, the client device 102 may also stop attenuating the outer subcarriers of the wireless signal. Thus, signal transmission can be dynamically adjusted in various ways to accommodate changes in downlink and/or uplink activity and to optimize use of available channels.

Figure 11:
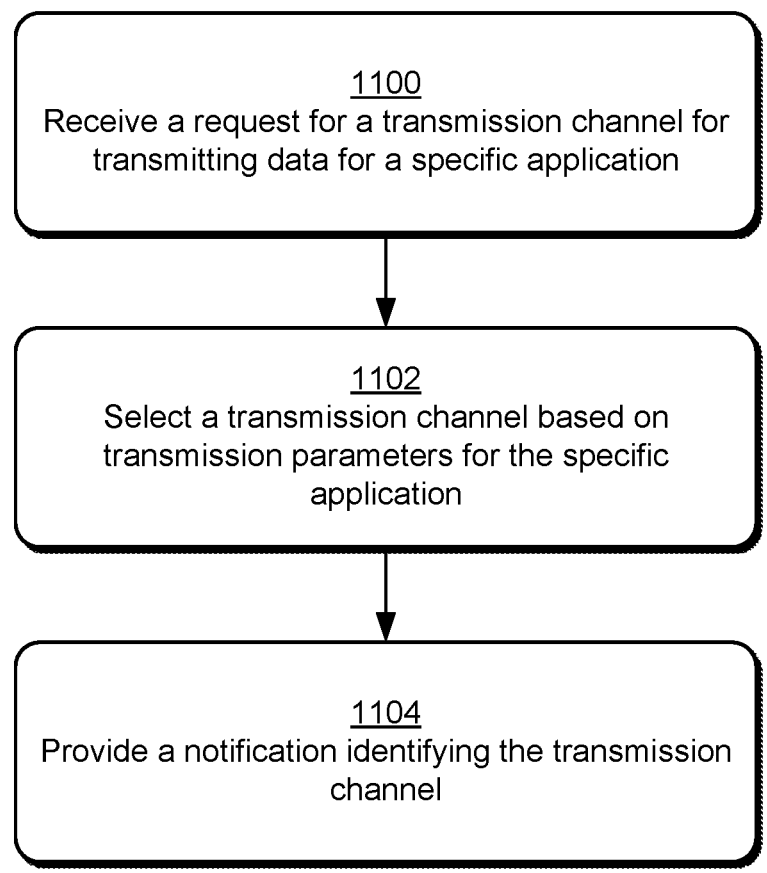
FIG. 11 is a flow diagram that describes steps in a method for considering application parameters when identifying available channels in accordance with one or more embodiments.

FIG. 11 is a flow diagram that describes steps in a method for considering application parameters when identifying available channels in accordance with one or more embodiments.

Step 1100 receives a request for a transmission channel for transmitting data for a specific application. The channel database service 116, for instance, receives a request from the client device 102 (e.g., via the wireless base station 112) for a transmission channel from transmitting data for the communication application 110.

Step 1102 selects a transmission channel based on transmission parameters for the specific application. In at least some embodiments, the transmission channel is selected from available white spaces and guard bands in a particular region. For example, the channel database service 116 may be preconfigured to identify channels that satisfy certain transmission parameters for the communication application 110. Examples of such transmission parameters include a noise floor level threshold (e.g., a maximum allowed noise floor), minimum S/N ratio, a maximum allowed amount of channel traffic, minimum channel bandwidth, and so forth.

Step 1104 provides a notification identifying the transmission channel. The channel database service 116 and/or the wireless base station 112, for example, notifies the client device 102 of one or more channels (e.g., white spaces, guard bands, and so forth) that correspond to the transmission parameters for the communication application 110. Thus, the channel(s) may be leveraged to transmit and/or receive data for the communication application 110.

Having discussed some example procedures, consider now a discussion of an example system and device in accordance with one or more embodiments.

Example System and Device

Figure 12:
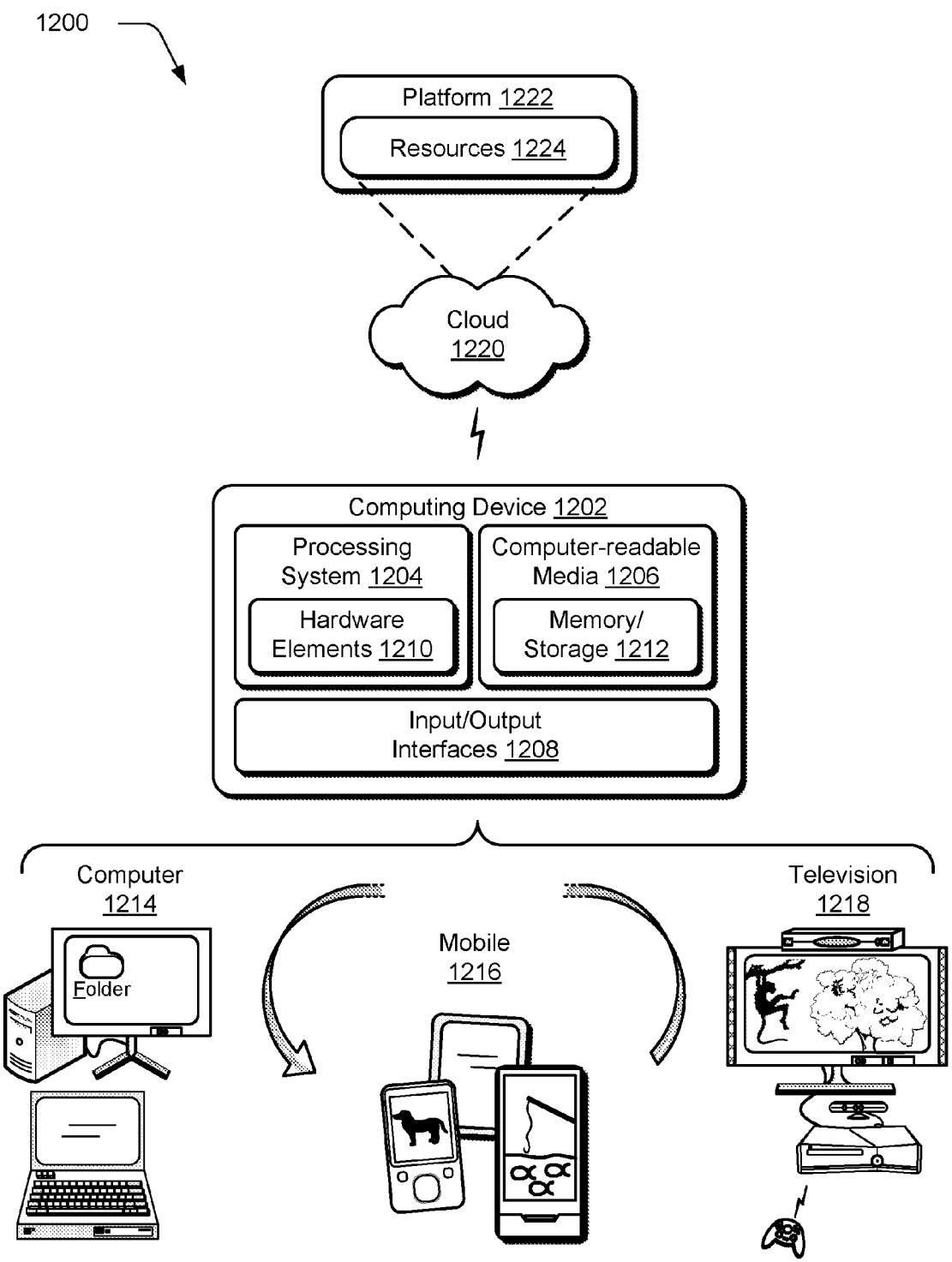
FIG. 12 illustrates an example system and computing device as described with reference to FIG. 1, which are configured to implement embodiments of techniques described herein.

FIG. 12 illustrates an example system generally at 1200 that includes an example computing device 1202 that is representative of one or more computing systems and/or devices that may implement various techniques described herein. For example, the client device 102 discussed above with reference to FIG. 1 can be embodied as the computing device 1202. The computing device 1202 may be, for example, a server of a service provider, a device associated with the client (e.g., a client device), an on-chip system, and/or any other suitable computing device or computing system.

The example computing device 1202 as illustrated includes a processing system 1204, one or more computer-readable media 1206, and one or more I/O Interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage 1212 may include volatile media (such as random access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of modules discussed herein as software may be achieved at least partially in hardware, e.g., through use of computer-readable storage media and/or hardware elements 1210 of the processing system. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, portable gaming device, a tablet computer, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. For example, functionalities discussed with reference to the client device 102, the wireless base station 112, and/or the channel database service 116 may be implemented all or in part through use of a distributed system, such as over a "cloud" 1220 via a platform 1222 as described below.

The cloud 1220 includes and/or is representative of a platform 1222 for resources 1224. The platform 1222 abstracts underlying functionality of hardware (e.g., servers) and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or Wi-Fi™ network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device embodiment, implementation of functionality described herein may be distributed throughout the system 1200. For example, the functionality may be implemented in part on the computing device 1202 as well as via the platform 1222 that abstracts the functionality of the cloud 1220.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Conclusion

Techniques for guard band usage for wireless data transmission are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   one or more processors; and
   one or more computer-readable storage media storing computer-executable instructions that are executable by the one or more processors to perform operations including:
   ascertaining available white spaces in a region of the radio spectrum;
   determining whether there is service deployment in a licensed band adjacent to a guard band in the region, said determining including determining that there is not infrastructure in place for deployment of service in the licensed band; and
   providing a notification of identifiers for the available white spaces and an indication that there is not infrastructure in place for service deployment in the licensed band to enable a client device to utilize the guard band and one or more of the white spaces for wireless data transmission.

2. A system as described in claim 1, wherein the guard band occurs between a television band and a downlink band.

3. A system as described in claim 1, wherein the licensed band comprises one or more of a downlink band or an uplink band adjacent to the guard band.

4. A system as described in claim 1, wherein the operations further comprise:
   receiving an indication of a change to white space availability in the region; and providing a notification of the change to the white space availability to the client device.

5. A system as described in claim 4, wherein the change comprises one or more of:
at least one additional white space is available; or
a previously-available white space is no longer available.

6. A system as described in claim 1, wherein the operations further comprise:
receiving a request for a transmission channel for transmitting data for a specific application;
selecting one or more transmission channels based on transmission parameters for the specific application, the one or more transmission channels being selected from the available white spaces and the guard band; and
providing a notification identifying the one or more transmission channels.

7. A system as described in claim 6, wherein the transmission parameters comprise one or more of a noise floor threshold, a maximum allowed amount of channel traffic, or a minimum channel bandwidth for the specific application.

8. A system as described in claim 1, wherein said ascertaining is performed in response to a query from the client device for an available wireless channel in a particular geographical region.

9. A method comprising:
ascertaining an available white space in a region of the radio spectrum;
determining whether there is service deployment in a licensed band adjacent to a guard band in the region, said determining including determining that there is not infrastructure in place for deployment of service in the licensed band; and
providing a notification of an identifier for the available white space and an indication that there is not infrastructure in place for service deployment in the licensed band to enable a client device to utilize the guard band and the white space for wireless data transmission.

10. A method as described in claim 9, wherein the licensed band comprises one or more of a downlink band or an uplink band adjacent to the guard band.

11. A method as described in claim 9, further comprising:
receiving an indication of a change to white space availability in the region; and
providing a notification of the change to the white space availability to the client device.

12. A method as described in claim 11, wherein the change comprises an indication that the white space is no longer available.

13. A method as described in claim 9, further comprising:
receiving a request for a transmission channel for transmitting data for a specific application;
selecting one or more transmission channels based on transmission parameters for the specific application, the one or more transmission channels being selected from the white space and the guard band; and
providing a notification identifying the one or more transmission channels.

14. A method as described in claim 13, wherein the transmission parameters comprise one or more of a noise floor threshold, a maximum allowed amount of channel traffic, or a minimum channel bandwidth for the specific application.

15. A method as described in claim 9, wherein said ascertaining is performed in response to a query from the client device for an available wireless channel in a particular geographical region.

16. A method comprising:
receiving a query from a client device for an available wireless channel in a particular geographical region;
ascertaining an available white space in the particular geographical region;
determining whether there is service deployment in a licensed band adjacent to a guard band in a particular portion of radio spectrum in which the available white space resides, said determining including determining there is not infrastructure in place for deployment of service in the licensed band; and
providing a notification of an identifier for the available white space and an indication that there is not infrastructure in place for service deployment in the licensed band to enable a client device to utilize the guard band and the white space for wireless data transmission.

17. A method as described in claim 16, wherein said ascertaining is based on the available white space meeting a transmission parameter for a specific application.

18. A method as described in claim 16, further comprising:
receiving an indication of a change to white space availability in the region; and
providing a notification of the change to the white space availability to the client device.

19. A method as described in claim 18, wherein the change comprises one or more of:
the white space is no longer available; or
at least one additional white space is available.

20. A method as described in claim 16, wherein said determining comprises determining that there is service deployment in the licensed band, and where the notification indicates that there is service deployment in the licensed band.

* * * * *